United States Patent
Lee et al.

(10) Patent No.: US 9,587,150 B2
(45) Date of Patent: Mar. 7, 2017

(54) ADHESIVES COMPRISING GRAFTED ISOBUTYLENE COPOLYMER

(71) Applicant: 3M INNOVATIVE PROPERTIES COMPANY, St. Paul, MN (US)

(72) Inventors: Hae-Seung Lee, Woodbury, MN (US); Jonathan E. Janoski, Woodbury, MN (US); Joon Chatterjee, Bloomington, MN (US); Kevin M. Lewandowski, Inver Grove Heights, MN (US); Babu N. Gaddam, Woodbury, MN (US)

( * ) Notice: Subject to any disclaimer, the term of this patent is extended or adjusted under 35 U.S.C. 154(b) by 0 days.

(21) Appl. No.: 14/415,777

(22) PCT Filed: Aug. 12, 2013

(86) PCT No.: PCT/US2013/054459
§ 371 (c)(1),
(2) Date: Jan. 20, 2015

(87) PCT Pub. No.: WO2014/028356
PCT Pub. Date: Feb. 20, 2014

(65) Prior Publication Data
US 2015/0166854 A1 Jun. 18, 2015

Related U.S. Application Data

(60) Provisional application No. 61/682,816, filed on Aug. 14, 2012.

(51) Int. Cl.
*C09J 123/22* (2006.01)
*C09J 123/28* (2006.01)
*C09J 151/06* (2006.01)
*B05D 5/00* (2006.01)
*C08F 299/00* (2006.01)

(52) U.S. Cl.
CPC .............. *C09J 151/06* (2013.01); *B05D 5/00* (2013.01); *C08F 299/00* (2013.01); *C09J 123/22* (2013.01); *C09J 123/283* (2013.01); *Y10T 428/2878* (2015.01)

(58) Field of Classification Search
None
See application file for complete search history.

(56) References Cited

U.S. PATENT DOCUMENTS

| | | | |
|---|---|---|---|
| 2,803,615 | A | 8/1957 | Ahlbrecht |
| 3,842,059 | A | 10/1974 | Milkovich |
| 4,181,752 | A | 1/1980 | Martens |
| 4,329,384 | A | 5/1982 | Vesley |
| 4,330,590 | A | 5/1982 | Vesley |
| 4,533,723 | A | 8/1985 | Weitemeyer |
| 4,619,979 | A | 10/1986 | Kotnour |
| 4,732,808 | A | 3/1988 | Krampe |
| 4,843,134 | A | 6/1989 | Kotnour |
| 5,204,219 | A | 4/1993 | Van Ooij |
| 5,227,426 | A * | 7/1993 | Tse .......................... C09J 151/06 524/534 |
| 5,264,494 | A | 11/1993 | Ho |
| 5,459,174 | A | 10/1995 | Merrill |
| 5,464,900 | A | 11/1995 | Stofko, Jr. |
| 5,468,353 | A | 11/1995 | Anich |
| 5,602,221 | A | 2/1997 | Bennett |
| 5,639,546 | A | 6/1997 | Bilkadi |
| 5,644,007 | A | 7/1997 | Davidson |
| 5,852,148 | A | 12/1998 | Behr |
| 6,063,838 | A | 5/2000 | Patnode |
| 6,380,149 | B2 | 4/2002 | Flynn |
| 6,448,353 | B1 | 9/2002 | Nelson |
| 6,630,238 | B2 | 10/2003 | Hyde |
| 6,632,522 | B1 | 10/2003 | Hyde |
| 6,664,354 | B2 | 12/2003 | Savu |
| 6,737,476 | B1 | 5/2004 | Hopkins |
| 7,915,333 | B2 | 3/2011 | Resendes |
| 8,232,350 | B2 | 7/2012 | Fujita |
| 8,530,578 | B2 | 9/2013 | Bharti |
| 8,597,784 | B2 | 12/2013 | Lee |
| 8,629,209 | B2 | 1/2014 | Lee |
| 8,663,407 | B2 | 3/2014 | Joly |
| 8,673,996 | B2 | 3/2014 | Lee |

(Continued)

FOREIGN PATENT DOCUMENTS

| EP | 0252372 | 1/1988 |
|---|---|---|
| EP | 0372756 | 6/1990 |

(Continued)

OTHER PUBLICATIONS

Fónagy, T. et al. Macromolecular Rapid Communications vol. 19 pp. 479-483 (Sep. 1998).*
Nuyken, O. et al. Macromolecular Rapid Communications vol. 18 pp. 125-131 (Feb. 1997).*
Nuyken, O. et al, Polymer Bulletin vol. 38 pp. 657-664 (Jun. 1997).*
Abbate, "Maleated Polyisobutylene: A Novel Toughener for Unsaturated Polyester Resins", Journal of Applied Polymer Science, 1995, vol. 58, No. 10, pp. 1825-1837.
Brooks, "Grant Copolymers of Rubbers and Polystyrene Prepared with "Living" Polymers"; Polymer Letters, 1967, vol. 5, pp. 641-646.
Chung, "Butyl Rubber Graft Copolymers: Synthesis and Characterization", Polymer, 1995, vol. 36, No. 18, pp. 3565-3574.
Parent, "Amine Substitution Reactions of Brominated Poly(isobutylene—co-isoprene): New Chemical Modification and Cure Chemistry", Macromolecules, 2002, vol. 35, No. 9, pp. 3374-3379.

(Continued)

*Primary Examiner* — Irina S Zemel
*Assistant Examiner* — Jeffrey Lenihan

(57) ABSTRACT

An adhesive composition is described comprising a tackifier and at least one grafted isobutylene copolymer. The grafted isobutylene copolymer has the formula: $R^1$—($R^2$—Z) wherein $R^1$ represents an isobutylene copolymer, $R^2$ is a covalent bond or multivalent alkylene or arylene, and Z is a grafted polymer. Z is typically a homopolymer of copolymer comprising alkene repeat units, aralkylene repeat units, or a combination thereof. Also described are adhesive coated articles, methods of making adhesive coated articles, and grafted isobutylene polymers.

14 Claims, No Drawings

(56) References Cited

U.S. PATENT DOCUMENTS

| | | |
|---|---|---|
| 2009/0026934 A1 | 1/2009 | Fujita |
| 2009/0281002 A1 | 11/2009 | Casper |
| 2011/0073901 A1 | 3/2011 | Fujita |
| 2011/0282010 A1 | 11/2011 | Fujita |
| 2012/0064304 A1 | 3/2012 | Bharti |
| 2012/0128966 A1 | 5/2012 | Ma |
| 2012/0208013 A1 | 8/2012 | Clapper |
| 2012/0285618 A1 | 11/2012 | Bharti |
| 2013/0131273 A1 | 5/2013 | Clapper |
| 2013/0269932 A1 | 10/2013 | Dams |
| 2014/0014330 A1 | 1/2014 | Dams |

FOREIGN PATENT DOCUMENTS

| | | |
|---|---|---|
| EP | 0448902 | 10/1991 |
| EP | 1057861 | 12/2000 |
| EP | 1757629 | 2/2007 |
| GB | 1276673 | 6/1972 |
| WO | WO 92-11295 | 7/1992 |
| WO | WO 2006-093702 | 9/2006 |
| WO | WO 2007-087281 | 8/2007 |
| WO | WO 2009-148716 | 12/2009 |
| WO | WO 2009-148722 | 12/2009 |
| WO | WO 2010-083192 | 7/2010 |
| WO | WO 2010-141248 | 12/2010 |
| WO | WO 2011-017298 | 2/2011 |
| WO | WO 2011-062851 | 5/2011 |
| WO | WO 2011-062852 | 5/2011 |
| WO | WO 2012-112303 | 8/2012 |

OTHER PUBLICATIONS

Parent, "Ion-Dipole Interation Effects in Isobutylene-based Ammonium Bromide Ionomers", Journal of Polymer Science: Part A: Polymer Chemistry, 2005, vol. 43, pp. 5671-5679.

Shirai, "Photoacid and Photobase Generators: Chemistry and Applications to Polymeric Materials", Progress in Polymer Science, 1996, vol. 21, pp. 1-45.

Sorenson, "Preparative Methods of Polymer Chemistry", $2^{nd}$ Edition, 209 (1968).

Wakabayashi, "Studies on s-Triazines. I. Cotrimerization of Trichloroacetonitrile with Other Nitriles", Bulletin of the Chemical Society of Japan, 1969, vol. 42, pp. 2924-2930.

International Search Report for PCT International Application No. PCT/US2013/054459 mailed on Nov. 7, 2013, 3 pages.

\* cited by examiner

ADHESIVES COMPRISING GRAFTED ISOBUTYLENE COPOLYMER

CROSS REFERENCE TO RELATED APPLICATIONS

This application is a national stage filing under 35 U.S.C. 371 of PCT/US2013/054459, filed Aug. 12, 2013, which claims priority to U.S. Provisional Application No. 61/682,816, filed Aug. 14, 2012, the disclosure of which is incorporated by reference in their entirety herein.

SUMMARY

In one embodiment, an adhesive composition is described. The adhesive comprises a tackifier and at least one grafted isobutylene copolymer. The grafted isobutylene copolymer has the formula: $R^1$—$(R^2$—$Z)$ wherein $R^1$ represents an isobutylene copolymer, $R^2$ is a covalent bond or a multivalent alkylene or arylene, and Z is a grafted polymer. Z is typically a homopolymer or copolymer comprising alkene repeat units, aralkylene repeat units, or a combination thereof. In some embodiments, Z comprises aralkylene repeat units and Z physically crosslinks. In other embodiments, Z comprises alkene repeat units and the unsaturations of the alkene repeat units crosslink.

In some embodiments, the grafted isobutylene copolymer of the adhesive is of the formula;

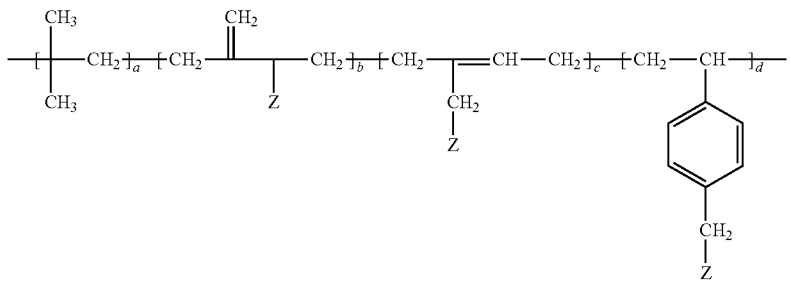

wherein Z is the grafted polymer, a is at least 20; and the sum of b, c, and d is at least one.

The grafted isobutylene can be prepared by reacting an isobutylene copolymer comprising halogenated comonomer repeat units with an alkali metal hydrocarbon or alkoxide salt terminated polymer.

In another embodiment, a method of making an adhesive article is described comprising providing an adhesive composition as described herein, coating the adhesive composition onto a substrate; and exposing the coated adhesive to actinic radiation thereby crosslinking at least a portion of the alkene repeat units of the grafted polymer.

In yet another embodiment, a grafted isobutylene copolymer is described of the formula: $R^1$—$(R^2$—$Z)_x$ wherein $R^1$ represents the isobutylene copolymer having at least 20 repeat units, $R^2$ is a covalent bond or multivalent alkylene or arylene, and Z is a grafted polymer comprising alkene repeat units and having a number average molecular weight no greater than 30,000 g/mole. In some embodiments, the alkene repeat units comprise at least 8 carbon atoms. In some embodiments, Z is a copolymer further comprising aralkylene repeat units.

DETAILED DESCRIPTION

As used herein

"Alkyl" means a linear or branched, cyclic or acrylic, saturated monovalent hydrocarbon having from one to about twelve carbon atoms, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon having from three to about twelve carbon atoms, e.g., methylene, ethylene, propylene, 2-methylpropylene, pentylene, hexylene, and the like.

"Aryl" means a monovalent aromatic, such as phenyl, naphthyl and the like.

"Arylene" means a polyvalent, aromatic, such as phenylene, naphthalene, and the like.

"Aralkylene" means a group defined above with an aryl group attached to the alkylene, e.g., benzyl, 1-naphthylethyl, and the like.

"Unfunctionalized isobutylene polymer" refers to a homopolymer or copolymer that lacks reactive groups that can form a covalent bond.

The adhesive composition comprises isobutylene copolymer having pendent grafted polymer.

The grafted isobutylene copolymer may be represented by the general formula:

$$R^1—(R^2—Z)$$

where $R^1$ represents a polymeric isobutylene copolymer, $R^2$ is a covalent bond or a multivalent alkylene or arylene, and
Z is a grafted polymer.

The grafted isobutylene copolymer may also be represented by the general formula: $R^1$—$(R^2$—$Z)_x$ wherein $R^1$, $R^2$, and Z are as just described and subscript x represents a fraction of those repeat units of the isobutylene copolymer substituted by the polymer grafts. Typically 0.1 to 40 percent, preferably 0.1 to 20 percent, more preferably 1 to 5 percent, of the repeat units of the isobutylene copolymer will be substituted by the grafted polymer (Z).

The grafted isobutylene copolymer is generally prepared by reaction of an isobutylene copolymer that comprises isobutylene repeat units and halogenated second repeat units.

In some embodiments, the halogenated second repeat units are alkene repeat units. As used herein, "alkene" means a linear or branched divalent hydrocarbon having an unsaturation, e.g. butene, pentene, hexene, octene and the like. In typical embodiments, the alkene repeat units of the copolymer are derived from a conjugated diene such as isoprene, butadiene, or a combination thereof.

Halogenated units derived from isoprene can be represented by the following formulas:

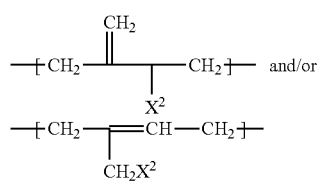

wherein $X^2$ is bromine.

In other embodiments, the halogenated second repeat units are aralkylene repeat units. For example, halogenated units derived from para-alkyl styrene can be represented by the following formula:

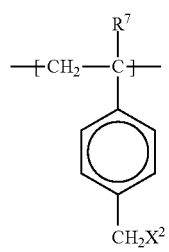

wherein $X^2$ is bromine and $R^7$ is H or $CH_3$.

Parametylstyrene monomer units can impart heat resistance and strength to the copolymer by the cohesive force and hardness of paramethylstyrene itself. To obtain such an effect, paramethylstyrene can be contained in the isobutylene copolymer backbone in amounts of greater than zero, preferably about 1 to 20 parts by weight based on the total amount of the copolymer. Alternatively, repeat units of the grafted polymer (Z) can comprise styrene.

The grafted isobutylene copolymers may be prepared by anionic polymerization of a polymerizable monomer to form a living polymer. Living polymers are conveniently prepared by contacting the monomer with an alkali metal hydrocarbon or alkoxide salt in the presence of an inert organic diluent.

The initiators for anionic polymerization may be any of the alkali metal hydrocarbons or alkoxide salts that produce a mono-functional living polymer, i.e., only one end of the polymer contains a reactive ion. Such initiators include the hydrocarbons of lithium, sodium or potassium, for example, having an alkyl radical containing up to 20 carbon atoms or more, and preferably up to 8 carbon atoms. Illustrative alkali metal hydrocarbons include ethylsodium, propylsodium, butylpotassium, octylpotassium, phenylsodium, ethyllithium, butyllithium, sec-butyllithium, isobutyllithium, tert-butyllithium and 2-ethylhexyllithium. Sec-butyllithium is the preferred initiator. Organolithium reagents initiated polymeric materials can be synthesized using a continuous polymerization reactor as described in U.S. Pat. Nos. 5,644,007 and 6,448,353.

Various living polymers can be prepared as known in the art. For example, sec-butyl lithium initiated polyisoprene can be prepared according to the following reaction scheme:

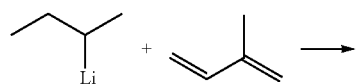

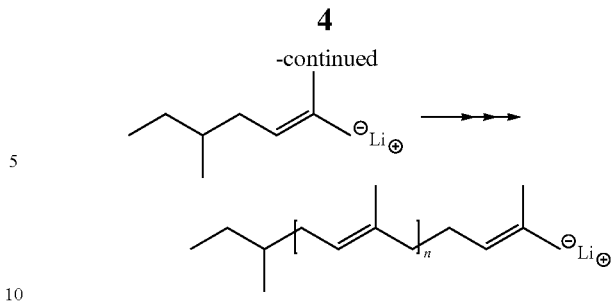

In another example, sec-butyl lithium initiated polystyrene can be prepared according to the following reaction scheme:

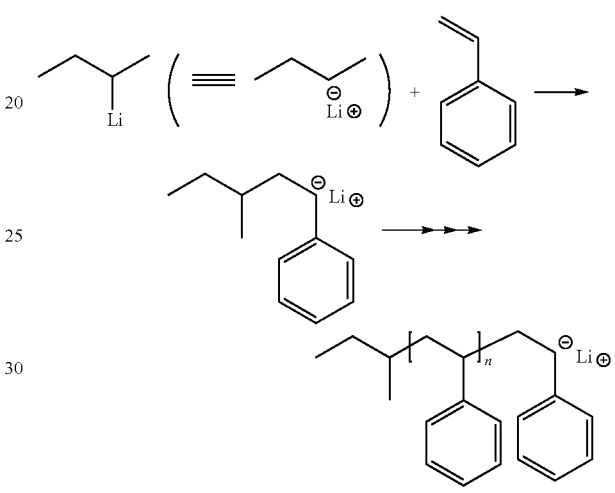

The terminal lithium group of the living polymer can then react with the pendent bromine of the brominated isobutylene copolymer (e.g. brominated isoprene or styrene second repeat units) to graft the living polymer onto the isobutylene copolymer backbone. Lithium bromide is concurrently formed as a by-product. The formerly halogenated repeat units are directly bonded to the grafted polymer. Thus, there are no other linking groups (e.g. such as the nucleophilic residue "Q" as described in PCT Publication WO2012/112303) between the formerly halogenated repeat units and the grafted polymer.

The amount of initiator usually dictates the molecular weight of the living polymer (i.e. grafted polymer Z). If a small portion of initiator is used with respect to the amount of monomer, the molecular weight of the living polymer will generally be larger than if a greater amount of initiator is used. Generally, the initiator concentration can vary from about 0.01 to about 0.1 mole of active alkali metal per mole of monomer, or higher. Preferably, the initiator is used in amounts to provide a grafting polymer the desired molecular weight.

In some embodiments, the molecular weight, Mn, of the living grafted polymer that forms the graft is typically at least 1000, 2000, 3000, 4000, or 5000 g/mole and no greater than 50,000 g/mole. In some embodiments, Mn is no greater than 40,000 or 35,000 or 30,000, or 25,000 g/mole. The molecular weight of the grafted polymer is preferably in this range when there the number of grafting sites (i.e. concentration of bromine in the isobutylene copolymer backbone) is relatively large.

However, when the number of grafting sites is relatively low, the upper limit of the molecular weight of the grafting polymer may be higher, for example ranging up to 150,000 g/mole. In some embodiments, the number average molecular weight is no greater than 120,000 g/mole, or 100,000 g/mole, or 80,000 g/mole, or 60,000 g/mole.

The polydispersity (Mw/Mn) of the living polymer is typically relatively narrow. In some embodiments, the polydispersity is no greater than 1.5, 1.4, 1.3 or 1.2.

The grafted isobutylene copolymer may be represented by the following formula:

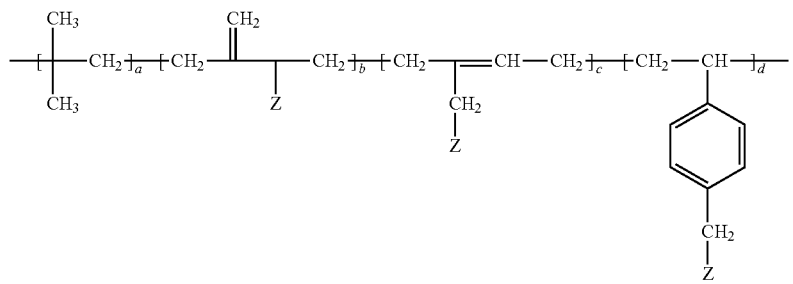

wherein Z is the grafted polymer, a is at least 20; and the sum of b, c, and d is at least one.

With respect to the copolymer just described, it will be recognized that the monomer units having the subscript "a" are polymerized isobutylene monomer units. Further, the subscripts "b" and "c" or "d" are chosen such that the copolymer comprises 0.1 to 40, preferably 0.1 to 20, more preferably 1 to 5 wt.-% of the respective monomer units comprise the grafted polymer (Z). In some embodiments, d is zero. In other embodiments, b and c are zero. In yet other embodiments, a blend of grafted isobutylene copolymers may be utilized in which a, b, c, and d are different for each copolymer of the blend.

Various living polymers can be grafted onto the halogenated isobutylene copolymer by reacting anionically polymerized reactive polymers with halogenated isobutylene copolymer. The grafted polymer (Z) may comprise for example alkene repeat units, aralkylene groups, or a combination thereof.

In some embodiments, the living polymer that is grafted onto the halogenated isobutylene copolymer backbone comprises alkene repeat units. The alkene repeat units are derived from $C_4$-$C_{20}$ alkene monomers comprising at least two carbon-carbon double bonds. For example, conjugated diolefins that can be utilized as starting monomers of the living polymers have the general structural formula

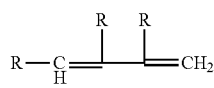

wherein R is independently H or an alkyl group. The sum of the carbon atoms of the R groups typically ranges from 4 to 20. Some representative examples of suitable conjugated diolefins include 1,3-butadiene, isoprene, 2-methyl-1,3-pentadiene, 4-butyl-1,3-pentadiene, 2,3-dimethyl-1,3-pentadiene, 1,3-hexadiene, 1,3-octadiene, 2,3-dibutyl-1,3-pentadiene, 2-ethyl-1,3-pentadiene, 2-ethyl-1,3-butadiene and the like. In some embodiments, the grafting polymer is derived from conjugated diolefin monomers containing 4 to 8 carbon atoms such as 1,3-butadiene (forming butene repeat units) or isoprene (forming pentene repeat units). In some embodiments, the grafted polymer (Z) is a polyisoprene copolymer or homopolymer. In another embodiment, the grafted polymer comprises alkene repeat units comprising at least 8 carbon atoms.

When the grafted polymer is a homopolymer or copolymer of one or more conjugated diolefins, the grafted polymer typically has a glass transition temperature, Tg, of <20° C. as can be determined by DSC (Differential Scanning Calorimeter) or DMA (Dynamic Mechanical Analysis).

When the grafted polymer is a copolymer of one or more conjugated diolefins and a higher Tg comonomer, the grafted polymer may also have a Tg of <20° C., particularly when the grafted polymer comprises a high weight ratio of the conjugated diolefin monomer(s) relative to the comonomer.

In other embodiments, the living polymer that is grafted onto the halogenated isobutylene copolymer backbone comprises aralkylene repeat units.

Generally, any vinyl aromatic monomer, that is known to polymerize with organo-alkali metal initiators, can be used. Some examples of vinyl aromatic monomers include styrene, alpha-methyl styrene, various alkyl styrenes including p-methylstyrene, p-methoxy styrene, 1-vinyl-naphthalene, 2-vinyl naphthalene, 4-vinyl toluene and the like. In some embodiments, the grafted polymer (Z) is an alkyl polystyrene copolymer or homopolymer.

When the grafting polymer has repeat units of a vinyl aromatic monomer, such repeat units may be represented by the following formula:

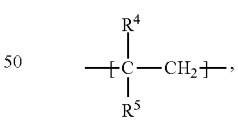

where $R^4$ is a hydrogen and $R^5$ is an aryl group of the formula;

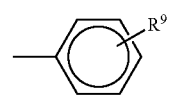

where $R^9$ is H, an alkyl, cycloalkyl or aryl group.

When the grafted polymer is a homopolymer or copolymer of one or more vinyl aromatic monomer, the grafted polymer typically has a Tg of ≥20° C. When the grafted polymer is a copolymer comprising at least one vinyl aromatic monomer and a lower Tg comonomer, the grafted polymer may also have a Tg of ≥20° C., particularly when the grafted copolymer comprises a high weight ratio of the vinyl aromatic monomer relative to the comonomer.

In some embodiments, the grafted polymer is a copolymer of one or more conjugated dienes and at least one other comonomer, such as a vinyl aromatic monomer. In some embodiments, the weight ratio of aromatic repeat units to alkene repeat units is at least 2:1, 3:1, 4:1, 5:1 or 6:1. The inclusion of the high concentration of aralkylene repeat units can impart heat resistance and strength. The inclusion of a small concentration of alkene repeat units provides unsaturated grafts that can crosslink further improving the heat resistance and strength.

A useful predictor of $T_g$ for combinations of monomers that may be utilized to form the grafting polymer can be computed by application of Fox Equation (1) (obtained from W. R. Sorenson and T. W. Campbell's text entitled "Preparative Methods of Polymer Chemistry", Interscience: New York (1968), p. 209). Specific values for the Tg of various homopolymers can be obtained from P. Peyser's chapter in "Polymer Handbook", 3rd edition, edited by J. Brandrup and E. H. Immergut, Wiley: New York (1989), pp. VI-209 through VI-277.

In some embodiments, such as when the grafted polymer comprises aralkylene repeat units, it is believed that the grafted polymer phase separates from the isobutylene polymer. This phase separation results in the formation of separate domains of the grafted polymer that function as physical crosslinks for the isobutylene copolymer. The cohesive strength of the adhesive tends to increase with the introduction of a greater amount of grafted polymer. Generally 0.01 to 40 percent, preferably 0.1 to 20 percent, more preferably 0.1 to 5 percent, of the repeat units of the isobutylene copolymer comprise the grafted polymer.

Physical crosslinking typically relies on the natural or induced formation of entanglements within the grafted polymeric chains and tends to increase the cohesive strength of adhesive compositions such as pressure-sensitive adhesive compositions. Physical crosslinking is often desired because the pressure-sensitive adhesive can be processed in a melted state at relatively high temperatures yet can take on a crosslinked form at lower temperatures. That is, the pressure-sensitive adhesives can be used as hot melt adhesives. In contrast, chemical crosslinked pressure-sensitive adhesives typically cannot be processed as hot melt adhesives. Hot melt processing is often considered desirable because the use of inert organic solvents can be minimized or eliminated. The minimization or elimination of inert organic solvents can be desirable from both an environmental and economic perspective.

To phase separate from the isobutylene polymer and to provide physical crosslinking, the grafting polymer is often selected to be immiscible in the isobutylene polymer at ambient temperatures. Physical crosslinking is enhanced when the grafting polymer has a glass transition temperature greater than or equal to at least 20° C. To form such a grafting polymer, the monomers used are selected to have a glass transition temperature equal to at least 20° C. (when polymerized as a homopolymer).

In addition to the glass transition temperature, the molecular weight of the grafting polymer can affect whether or not the grafted isobutylene copolymer will phase separate and physically crosslink. Phase separation and entanglement is more likely if the molecular weight of the grafting polymer has a molecular weight of at least 5000 grams/mole.

Further, cohesive strength of the pressure-sensitive adhesive tends to increase as the molecular weight of the grafting polymer increases.

If the molecular weight of the grafting polymer becomes too large, however, the number of grafted polymer formed on a weight basis by reaction with the isobutylene may be diminished. That is, as the molecular weight of the grafting polymer increases, it can become more difficult to achieve a high degree of substitution of grafted polymer on a weight basis. Additionally, the viscosity (particularly of hot melt adhesives) can become unfavorably high at typical processing temperature when the molecular weight of the grafting polymer is too high.

In other embodiments, such as when the grafted polymer comprises alkene repeat units, the unsaturated alkene repeat units of the grafts can crosslink with each other. In some favored embodiments, the unsaturated alkene repeat unit of the grafted polymer are radiation cured such as by photo-curing. In such embodiment, a photoinitiator is typically added to the adhesive composition.

The photocrosslinking agent can be a chromophore-substituted chloro-methyl-s-triazine crosslinking agent. In one embodiment, the crosslinking agent is as described in U.S. Pat. No. 4,330,590 (Vesley), and is of the formula:

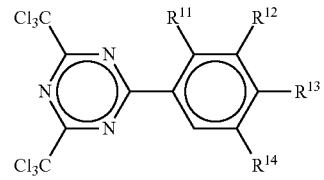

wherein $R^{10}$, $R^{12}$, $R^{13}$, and $R^{14}$ are independently hydrogen, alkyl, or alkoxy; and 1-3 of the $R^{10}$, $R^{12}$, $R^{13}$, and $R^{14}$ groups are hydrogen. Preferably, the alkyl and alkoxy groups have no more than 12 carbon atoms, and often no more than 4 carbon atoms. Preferably, both $R^{12}$ and $R^{13}$ are alkoxy, because this tends to provide shorter reaction times. Adjacent alkoxy substituents may be interconnected to form a ring. The photoactive s-triazine component may be prepared by the co-trimerization of an aryl nitrile with trichloroacetonitrile in the presence of HCl gas and a Lewis acid such as $AlCl_3$, $AlBr_3$, etc., as described in *Bull. Chem. Soc. Japan*, Vol. 42, page 2924 (1969).

In another embodiment, the crosslinking agent is photoactive s-triazine component as described in U.S. Pat. No. 4,329,384 (Vesley), and is of the formula:

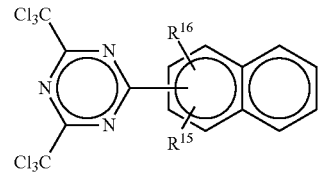

wherein $R^{15}$ and $R^{16}$ are independently hydrogen, alkyl, or alkoxy. By this representation, it is meant that $R^{15}$ and $R^{16}$ can be on either of the fused rings. Preferably, any alkyl or alkoxy group of the photoactive s-triazine component has no more than 12 carbon atoms, and no more than two alkyl and alkoxy groups have more than 6 carbon atoms. In certain embodiments, they have no more than 4 carbon atoms, and the alkyl is often methyl or ethyl, and the alkoxy is often methoxy or ethoxy. Adjacent alkoxy substituents may be interconnected to form a ring. The photoactive s-triazine component may be prepared by the co-trimerization of a polynuclear nitrile with trichloroacetonitrile in the presence of HCl gas and a Lewis acid such as $AlCl_3$, $AlBr_3$, etc. as described in *Bull. Chem. Soc. Jap.*, Vol. 42, pages 2924-2930 (1969).

Examples of suitable chlorinated triazine crosslinking agents include, but are not limited to, 2,4-bis(trichloromethyl)-6-(4-methoxyl)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxyl)phenyl)-s-triazine as described in U.S. Pat. No. 4,330,590 (Vesley), and 2,4-bis(trichloromethyl)-6-naphthenyl-s-triazine and 2,4-bis(trichloromethyl)-6-(4-methoxyl)naphthenyl-s-triazine as described in U.S. Pat. No. 4,329,384 (Vesley).

The chlorinated triazine crosslinking agent is preferably a photo-crosslinking agent. More preferably, the triazine crosslinking agent is a chromophore-substituted chloromethyl-s-triazine crosslinking agent, which can be prepared according to Wakabayashi et al., *Bull. Chem. Soc. Jap.*, Vol. 42, pages 2924-2930 (1969).

The grafted isobutylene copolymer is generally prepared by reaction of an isobutylene copolymer that comprises isobutylene repeat units and halogenated second repeat units.

In some embodiments, the grafted isobutylene copolymer is prepared from a random copolymer of isobutylene and halogenated (e.g. brominated) alkene (e.g. isoprene) repeat units, such as a commercially available from Lanxess. "Lanxess Bromobutyl 2030" isobutylene copolymer has a bromine content of about 1.5 to 2.0 wt.-% and a molecular weight (Mw) of about 500,000 g/mole. "Lanxess Bromobutyl X2" isobutylene copolymer has a bromine content of about 1.80±0.20 wt.-% and a molecular weight Mw) of about 650,000 g/mole.

In some embodiments, the grafted isobutylene copolymer can be prepared from a random copolymer of isobutylene and halogenated (e.g. brominated) para-methylstyrene repeat units, such as commercially available from Exxon Chemical Co. under the trade name of EXXPRO, including MDX90-10 MDX89-4. MDX90-10 isobutylene copolymer comprises 1.2 mole % or 7.5 wt.-% of brominated para-methylstyrene; whereas MDX90-10 isobutylene copolymer comprises 0.75 mole % or 5 wt.-% of brominated para-methylstyrene.

In other embodiments, the grafted isobutylene copolymer can be prepared from an unfunctionalized (e.g. unhalogenated) isobutylene copolymer that is first halogenated by reacting with N-bromosuccinimide (NBS) or atomic bromine and then subsequently reacted with the living polymer.

Additionally, unfunctionalized as well as ungrafted homopolymers and copolymers can be blended with the grafted polyisobutylene copolymer as an optional, but additional component of the adhesive composition.

Useful isobutylene polymers (i.e. halogenated copolymers, as well as unfunctionalized and ungrafted polymers for blending) generally have a molecular weight (Mw) from 50,000 to 5,000,000 g/mole. In some embodiments, the weight average molecular weight ($M_w$) of the isobutylene copolymer is at least 100,000 g/mole, 200,000 g/mole, 300,000 g/mole, or 400,000 g/mole. In some embodiments, the weight average molecular weight is typically no greater than 4,000,000 g/mole or 3,000,000 g/mole, or 2,000,000 g/mole, and in some embodiments no greater than 1,000,000 g/mole or 750,000 g/mole.

In some embodiments, the adhesive further comprises an unfunctionalized and/or ungrafted isobutylene homopolymer or copolymer. The unfunctionalized isobutylene copolymers are generally synthetic rubbers having an isobutylene copolymer main chain. Isobutylene homopolymers are commercially available, for example, under the trade designation OPPANOL (e.g., OPPANOL B10, B15, B30, B50, B80, B100, B150, and B200) from BASF Corp. (Florham Park, N.J.). Isobutylene copolymers that are mostly isobutylene with a small amount of isoprene comonomer, are available under the tradenames VISTANEX (Exxon Chemical Co.) and JSR BUTYL (Japan Butyl Co., Ltd.). Synthetic rubbers also include copolymers of mostly isobutylene with n-butene or butadiene comonomer.

When utilized, the total concentration of unfunctionalized and/or ungrafted isobutylene copolymer or homopolymer in the adhesive composition is typically at least 5 wt. %, or 10 wt.-%, 15 wt.-%. The concentration of unfunctionalized and/or ungrafted isobutylene copolymer or homopolymer is typically no greater than 60 wt. %, or 55 wt.-%, or 50 wt.-%.

The adhesive comprises at least one tackifier. The tackifier can have any suitable softening temperature or softening point. The softening temperature is often less than 200° C., less than 180° C., less than 160° C., less than 150° C., less than 125° C., or less than 120° C. In applications that tend to generate heat, however, the tackifier is often selected to have a softening point of at least 75° C. Such a softening point helps minimize separation of the tackifier from the rest of the adhesive composition when the adhesive composition is subjected to heat such as from an electronic device or component. The softening temperature is often selected to be at least 80° C., at least 85° C., at least 90° C., or at least 95° C. In applications that do not generate heat, however, the tackifier can have a softening point less than 75° C.

Exemplary tackifiers include hydrocarbon resins and hydrogenated hydrocarbon resins, e.g., hydrogenated cycloaliphatic resins, hydrogenated aromatic resins, or combinations thereof. Suitable tackifiers are commercially available and include, e.g., those available under the trade designation ARKON (e.g., ARKON P or ARKON M) from Arakawa Chemical Industries Co., Ltd. (Osaka, Japan); those available under the trade designation ESCOREZ (e.g., ESCOREZ 1315, 1310LC, 1304, 5300, 5320, 5340, 5380, 5400, 5415, 5600, 5615, 5637, and 5690) from Exxon Mobil Corporation, Houston, Tex.; and those available under the trade designation REGALREZ (e.g., REGALREZ 1085, 1094, 1126, 1139, 3102, and 6108) from Eastman Chemical, Kingsport, Tenn.

The concentration of tackifier can vary depending on the intended adhesive composition. In some embodiments, the amount of tackifier is at least 5 wt.-%, 10 wt.-% or 15 wt.-%. The maximum amount of tackifier is typically no greater than 50 wt.-%, or 45 wt.-%, or 30 wt.-% tackifying resin. For removeable masking tapes, the tackifier concentration may be no greater than about 30 wt.-%. However, for other uses, higher tackifier concentrations may be favored.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the (e.g. pressure sensitive) adhesive of in an amount of 1, 2, 3, 4 or 5 wt.-%, and typically no greater than 30, or 25, or 20 or 15, or 10 wt.-% of the adhesive composition.

Those skilled in the art will also know that other additives such as fillers, antioxidants, stabilizers, and colorants may be blended with the adhesive for beneficial properties.

In some embodiments, the adhesive compositions are applied as a solvent solution or dispersion, the solvent evaporated, and the grafts of the grafted isobutylene copolymer physically crosslinker or crosslink on exposure to actinic radiation, such as UV. Crosslinking of such solvent-based compositions may occur before, but preferably occurs after coating and solvent removal. Suitable solvents such as alkanes, ethyl acetate, toluene and tetrahydrofuran are unreactive with the free-radically polymerizable groups of the components of the copolymer.

In other embodiments, such as hot-melt adhesive compositions, the adhesive is applied from the melt as is solvent-free. Hot melts are generally 100% solid adhesives with application temperatures which vary from about 150 to about 180° C. Hot melt coating eliminates the necessity of solvent processing. To hot melt process an adhesive composition, the composition us typically not crosslinked before and during the coating process. However, to achieve shear adhesion, crosslinking is typically preferred. In hot melt coating processes, this is usually done by exposure to high energy radiation (e.g., E-beam or high intensity ultraviolet radiation). Commonly, when high intensity ultraviolet radiation is used, a photoactive crosslinking species such as benzophenone is added to the composition. Generally, the hot melt adhesive compositions require a narrower range of molecular weights for the poly(isobutylene) copolymer than do solution coated compositions. Too low and the cross-linked polymer has insufficient cohesive strength. Too high and the composition cannot be extrusion coated.

The adhesive compositions can be coated on a substrate using conventional coating techniques to form an adhesive-coated article. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

The substrate is selected depending on the particular application in which it is to be used. For example, the adhesive can be applied to sheeting products, (e.g., decorative graphics and reflective products), label stock, and tape backings Additionally, the adhesive may be applied directly onto a substrate such as an automotive panel, or a glass window so that another substrate or object can be attached to the panel or window.

The adhesives may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

In favored embodiments, the adhesive is a pressure sensitive adhesive. According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests designed to measure tack, adhesion (peel strength), and cohesion (shear holding power). These measurements taken together constitute the balance of properties often used to characterize a PSA.

For example, if the glass transition temperature ($T_g$) or modulus of the elastomer is too high and above the Dahlquist criterion for tack (storage modulus of $3\times10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

The adhesives described herein are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are olefin-based thermoplastics (polypropylene, polyethylene, high density polyethylene or HDPE, ethylene propylene diene monomer rubber (EPDM)), as well as polystyrene and poly(methyl methacrylate) (PMMA). Such material as commonly used in automotives, paints, appliances and electronics markets. Other substrates may also have properties of low surface energy due to a residue, such as an oil residue or a film such as paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics, glass and metals. The adhesive compositions described herein are also suitable for the medical adhesive field due to having low odor and being physiologically inert.

The pressure sensitive adhesive can exhibit various peel and shear properties, depending on the intended end use.

In some embodiments the 90 degree peel to glass, stainless steel, high density polyethylene (HDPE), polypropylene (PP), or EPDM thermoplastic elastomer is at least 5 N/dm for a temporary removable or low temperature PSA. For masking tapes, the 90 degree peel to glass, stainless steel, HDPE, PP, or TPE is typically 15-20 oz/inch. In some favored embodiments, the adhesive exhibits good adhesion to both high and low surface energy substrates. In some embodiments the 90 degree peel to glass, stainless steel, PP, or EPDM thermoplastic elastomer is independently at least 25, 30, 35, 40, 45, 50, 55 or 60 oz/inch. In some embodiments the 90 degree peel to EPDM thermoplastic elastomer is independently at least 65, 70, 75, 80, 85, 90, 95 or 100 oz/inch. In some favored embodiment, the shear at room temperature (23° C.) or 70° C. is at least 2,000 minutes; 5,000 minutes; or 10,000 minutes.

The following, non-limiting, examples further describe exemplary adhesives and adhesive articles of the present disclosure, as well as exemplary methods for making such adhesives and adhesive articles.

As used in this section, the following apply. The word polymer may be a homopolymer or a co-polymer, or a mixture thereof. All percentages and parts are by weight unless stated otherwise. The designation "pph" refers to parts by weight per 100 hundred parts of poly(isobutylene) material including brominated PIB, functionalized PIB, and unfunctionalized PIB.

Test Methods:

90° Angle Peel Adhesion Strength Test.

Peel adhesion strength was measured at a 90° peel angle using an IMASS SP-200 slip/peel tester (available from IMASS, Inc., Accord Mass.) at a peel rate of 305 mm/minute (12 inches/minute). Test panels were prepared by wiping the panels with a tissue wetted with the corresponding solvents shown in Table 1 using heavy hand pressure to wipe the panel 8-10 times. This procedure was repeated two more times with clean tissues wetted with solvent. The cleaned panel was allowed to dry at room temperature. An adhesive coated film was cut into tapes measuring 1.27 cm×20 cm (½ in.×8 in.). A test sample was prepared by rolling the tape down onto a cleaned panel with 2 passes of a 2.0 kg (4.5 lb.) rubber roller. The prepared samples were stored at 23° C./50% RH for 24 hours before testing. Two samples were tested for each example and averaged values were expressed in N/dm.

Failure mode (Fail) was noted and recorded as COH—cohesive, i.e., the adhesive split leaving residue on both the tape and test surface, ADH—adhesive, i.e., the adhesive peeled cleanly from the test surface, and MIX—both adhesive and cohesive failure occurred on the test sample.

TABLE 1

Peel Adhesion Test Panel Materials

| Material | Solvent |
|---|---|
| HDPE—High density polyethylene | Isopropyl alcohol |
| PP—Polypropylene | Isopropyl alcohol |
| EPDM—Ethylene/propylene/diene monomer copolymer | Isopropyl alcohol |
| Thermoplastic Elastomer (TPE) based on EPDM and polypropylene | Isopropyl alcohol |
| SS—Stainless Steel | Heptane |
| Glass—Soda-lime glass | Heptane |

Static Shear Strength

The static shear strength was test as described in the ASTM International standard, D3654, Procedure A at 23° C./50% RH (relative humidity) using a 1000 g load. A 1.27 cm×15.24 cm (½ in.×6 in.) tape was adhered to 1.5 inch by 2 inch stainless steel (SS) panels using the method described in the Peel Adhesive Test to clean the panel and adhere the tape. The tape overlapped the panel by 1.27 cm×2.5 cm. and the unattached part of the tape was folded over itself on the adhesive side, and then folded again. A hook was hung in the second fold and secured by stapling the tape above the hook. A 1000 gram (g) weight was hung on the hook and the panels were hung vertically in a 23° C./50% RH room. The time to failure in minutes was recorded. If no failure was observed after 10,000 minutes, the test was stopped and a value of >10,000 minutes was recorded. The mode of failure described in the peel adhesion test was also recorded.

Materials Used for Examples

Acetone—Sigma Aldrich; St. Louis, Mo.

Activated molecular sieves (3 Å), Alfa Aesar; Ward Hill, Mass.

Activated basic alumina (60 mesh), Alfa Aesar; Ward Hill, Mass.

B15 PIB—OPPANOL B15 polymer (polyisobutylene, Medium MW, 80K g/mol, unfunctionalized synthetic rubber), BASF; Florham Park N.J.

Crosslinker—UV activated crosslinking agent—2,4-bis trichloromethyl-6-(3,4-dimethoxy phenyl)-s-triazine Heptane—Sigma Aldrich; St. Louis, Mo.

Isopropyl alcohol—Sigma Aldrich; St. Louis, Mo.

Isoprene (98%) Acros Organics; Pittsburgh, Pa.

Myrcene (70%)—TCI; Portland, Oreg.

PET film—Hostaphan® 3SAB (primed polyester film), Mitsubishi; Greer, S.C.

PIB—Lanxess Bromobutyl 2030 (brominated poly(isoprene-co-isoprene)), Lanxess Corporation; Akron, Ohio sec-Butyllithim, 1.4M in cyclohexane,—Spectrum Chemical; Gardena, Calif.

Styrene (99%)—GFS Chemicals; Powell, Ohio

TACK—ESCOREZ 5340 tackifier; cycloaliphatic hydrocarbon based tackifier, ExxonMobil Corporation; Baytown, Tex.

Toluene (99.5%)—EMD; Gibbstown, N.J.

Preparation of Reactive Polymers

All monomers were diluted to 10% by volume with toluene and passed through a 24 cm×240 cm column of activated molecular sieves (3 Å), then through a 24 cm×240 cm column of activated basic 60 mesh alumina prior to entering a stirred tube reactor in the examples below. A solution of 1.4M sec-Butyllithim in cyclohexane was used as received from the vendor.

Preparation of Poly(Styryl)Lithium Polymer (P1)

A 10% solution of styrene monomer in toluene was pumped into the bottom of a 230 mL, jacketed stirred tube reactor at a rate of 10.18 mL/min. and sec-Butyllithium was added at a rate of 0.187 mL/min. The reactor was maintained at 40° C. using a circulating bath and stirred at 75 rpm. A poly(styryl)lithium polymer solution was collected in a 500 mL, 3-neck, round-bottomed flask under positive nitrogen pressure. The flask had been rinsed with about 10 mL of the poly(styryl)lithium solution prior to collecting approximately 250 mL of the product which was a polymeric organolithium solution. GPC analysis showed that the polymer had a Mn=5,000 g/mol, a polydispersity (PDI) of 1.22

Preparation of Poly(Styryl)Lithium Polymer (P2)

A poly(styryl)lithium polymer solution was prepared according to the procedure of Example 1 except that the sec-Butyllithium was added at a rate of 0.094 mL/min. GPC analysis for the resulting polymer showed Mn=8,000 g/mol, PDI=1.22.

Preparation of Poly(Isoprenyl)Lithium Polymer (P3)

A poly(isoprenyl)lithium polymer solution was prepared according to the procedure of Example 2 except that a 10% solution of isoprene monomer in toluene was used instead of styrene. GPC analysis for the poly(isoprenyl)lithium polymer showed Mn=7,800 g/mol and PDI=1.17.

Preparation of Poly(Myrcene-b-Styryl)Lithium Polymer (P4)

A poly(myrcene-b-styryl)lithium polymer solution was prepared according to the procedure of Example 2 except that a 10% solution of a monomer mixture (80% styrene, 20% myrcene) in toluene was used instead of styrene. GPC analysis for the poly(myrcene-b-styryl)lithium polymer showed Mn=7,250 g/mol and PDI=1.21.

Reactive Polymer Grafted Bromobutyl Rubbers

Preparation of Polystyrene Grafted PIB Polymer (PIB1)

PIB (15.0 g) and toluene (135.00 g) were charged into a 500 mL round-bottomed flask equipped with a magnetic stir bar, and stirred at room temperature until the polymer was completely dissolved. Nitrogen was bubbled through the solution for 30 minutes and then azeotropically dehydrated by evaporating approximately 5 g of toluene with a rotary evaporator under reduced pressure. Then the flask was flushed with nitrogen, capped with a rubber septum, and 25.86 g of a solution of polymer P1 in toluene (solids of 0.087 g/mL) was slowly injected into the PIB solution. The mixture was thoroughly stirred at room temperature under a nitrogen atmosphere. After 2 hours, the reaction was poured into acetone to coagulate the modified polymer. The isolated polymer was washed with fresh acetone three times to remove unreacted polymer (polystyrene). The resulting polystyrene grafted PIB polymer was then filtered and dried in a vacuum oven for 12 hours at 50° C., and then cooled to room temperature.

Procedure for Synthesizing Polyisoprene Grafted PIB Polymer (PIB2)

PIB2 was prepared according to the procedure for PIB1 with polymer P2 instead of P1.

Procedure for Synthesizing Polyisoprene Grafted Polymer (PIB3)

PIB3 was prepared according to the procedure for PIB1 with polymer P3 instead of P1.

Procedure for Synthesizing Poly(Styrene-g-Myrcene) Grafted PIB Polymer (PIB4)

PIB4 was prepared according to the procedure for PIB1 with polymer P4 instead of P1.

Examples 1-10

Control Compositions C1-C2

Adhesive compositions shown in Table 2 were prepared by adding 400 parts of toluene and the amounts of PIB, tackifiers (TACK) and crosslinker, if used, to 100 mL glass jars. The jars were capped and mixed on a roller mill overnight. The materials are shown in parts per 100 hundred parts of total PIB by weight (pph). The total amount of PIB was kept at 100 parts Examples 1-10 were prepared with the PIB grafted polymers PIB1-PIB4, and examples C1-C2 were prepared with a commercially available PIB.

TABLE 2

Adhesive Compositions

| Ex | PIB Polymer Type | Amt (parts) | B15 PIB (parts) | TACK (pph) | Crosslinker (pph) |
|---|---|---|---|---|---|
| 1 | PIB1 | 100 | 0 | 20 | 0 |
| 2 | PIB1 | 70 | 30 | 20 | 0 |
| 3 | PIB2 | 100 | 0 | 20 | 0 |
| 4 | PIB2 | 70 | 30 | 20 | 0 |
| 5 | PIB3 | 100 | 0 | 20 | 0.2 |
| 6 | PIB3 | 70 | 30 | 20 | 0.2 |
| 7 | PIB4 | 100 | 0 | 20 | 0.2 |
| 8 | PIB4 | 70 | 30 | 20 | 0.2 |
| 9 | PIB4 | 100 | 0 | 20 | 0.2 |
| 10 | PIB4 | 70 | 30 | 20 | 0.2 |
| C1 | PIB | 100 | 0 | 20 | 0 |
| C2 | PIB | 70 | 30 | 20 | 0 |

The resulting composition were each knife-coated onto the primed side of a 6 inch by 25 inch strip of PET film to a thickness of about 15 mils wet. The coated film was dried in an oven set at 70° C. for 20 minutes to provide a tape having an adhesive coating thickness of approximately 2 mils.

The adhesive coatings for Examples 5-10 contained 0.2 parts of a photo-crosslinking agent. Examples 5-8 were irradiated with 400 mJ/cm$^2$ of total energy using a UV processor with a D-bulb (Fusion UV System, Inc.; Gaithersburg, Md., USA)

Examples 9-10, containing a photo-crosslinking agent were not irradiated.

The adhesive films there then cut into tapes and tested for 90° Peel Adhesion and Shear Strength at room temperature. Results are shown in Table 3.

TABLE 3

| | Adhesive Properties | | | | | | | |
|---|---|---|---|---|---|---|---|---|
| | 90° Peel Adhesion [oz/inch (N/dm)] | | | | | | Shear Strength | |
| Ex | HDPE | PP | TPE | SS | Glass | Fail | Min | Fail |
| 1 | 15(16) | 50(55) | 70(77) | 54(59) | 46(50) | ADH | 5100 | COH |
| 2 | 17(19) | 54(59) | 90(98) | 52(57) | 48(53) | ADH | 700 | COH |
| 3 | 16(18) | 48(52) | 68(74) | 46(50) | 37(40) | ADH | 6300 | COH |
| 4 | 19(21) | 57(62) | 87(95) | 46(50) | 44(48) | ADH | 900 | COH |
| 5 | 12(13) | 50(55) | 35(38) | 44(48) | 39(43) | ADH | >10,000 | None |
| 6 | 15(16) | 55(60) | 59(65) | 36(39) | 47(51) | ADH | >10,000 | None |
| 7 | 18(20) | 34(37) | 36(39) | 23(25) | 6(7) | ADH | >10,000 | None |
| 8 | 19(21) | 40(44) | 52(57) | 20(22) | 8(9) | ADH | >10,000 | None |
| 9 | NT | NT | NT | NT | NT | NT | 3500 | COH |
| 10 | NT | NT | NT | NT | NT | NT | 650 | COH |
| C1 | 5(5) | 6(7) | 67(73) | 26(28) | 23(25) | MIX | 835 | COH |
| C2 | 15(16) | 52(57) | 97(106) | 47(51) | 35(38) | COH | 157 | COH |

NT—Not tested

What is claimed is:

1. An adhesive composition comprising a tackifier and at least one grafted isobutylene copolymer having the formula:

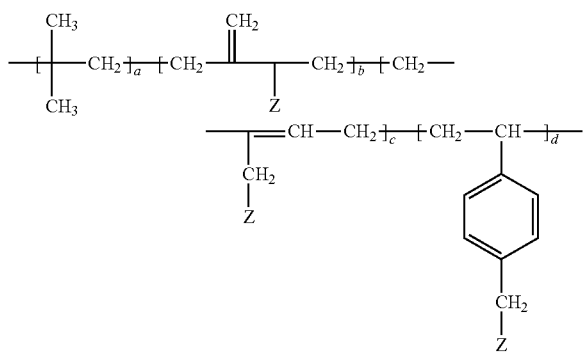

wherein Z is the grafted polymer, a is at least 20; the sum of b and c is at least one, and d is zero.

2. The adhesive composition of claim 1 wherein Z comprises alkene repeat units, aralkylene repeat units, or a combination thereof.

3. The adhesive composition of claim 2 wherein Z is derived from $C_4$-$C_{20}$ alkene monomers comprising at least two carbon-carbon double bonds.

4. The adhesive composition of claim 1 wherein Z is a grafted homopolymer.

5. The adhesive composition of claim 4 wherein Z comprises aralkylene repeat units and Z physically crosslinks.

6. The adhesive composition of claim 4 wherein Z comprises alkene repeat units and unsaturations of the alkene repeat units crosslink the grafted polymer.

7. The adhesive composition of claim 1 wherein Z is a grafted copolymer.

8. The adhesive composition of claim 1 wherein the grafted isobutylene copolymer comprises 0.01 to 40 wt.-% of repeat units that comprise the grafted polymer Z.

9. The adhesive composition of claim 1 wherein said grafted isobutylene copolymer is prepared by reacting anionically polymerized reactive polymers with halogenated isobutylene copolymer.

10. The adhesive composition of claim 1 wherein the grafted isobutylene copolymer is prepared from an isobutylene copolymer that has a weight average molecular weight ($M_w$) of 50,000 to 2,000,000 g/mole.

11. The adhesive composition of claim 1 wherein said grafted polymer, Z, has a number average molecular weight ranging from 1,000 to 30,000 g/mole.

12. The adhesive composition of claim 1 wherein the adhesive composition further comprises a second isobutylene polymer and the second isobutylene polymer is ungrafted, unfunctionalized, or ungrafted and unfunctionalized.

13. The adhesive composition of claim 1 wherein the adhesive composition comprises 10 to 50 wt.-% tackifier.

14. An adhesive article comprising the adhesive of claim 1 applied to a substrate.

* * * * *

UNITED STATES PATENT AND TRADEMARK OFFICE
CERTIFICATE OF CORRECTION

| | | |
|---|---|---|
| PATENT NO. | : 9,587,150 B2 | Page 1 of 1 |
| APPLICATION NO. | : 14/415777 | |
| DATED | : March 7, 2017 | |
| INVENTOR(S) | : Hae-Seung Lee | |

It is certified that error appears in the above-identified patent and that said Letters Patent is hereby corrected as shown below:

<u>Page 2, Column 2 (Other Publications)</u>
Line 1, delete "Interation" and insert -- Interaction --, therefor.

<u>Column 5</u>
Line 52, delete "formula" and insert -- formula: --, therefor.

<u>Column 9</u>
Line 10, delete "methoxyl)" and insert -- methoxy) --, therefor.
Line 15, delete "methoxyl)" and insert -- methoxy) --, therefor.
Line 18, delete "methoxyl)" and insert -- methoxy) --, therefor.

<u>Column 11</u>
Line 50, delete "backings" and insert -- backings. --, therefor.

<u>Column 12</u>
Line 42, delete "backing" and insert -- backing. --, therefor.
Line 54, delete "backings" and insert -- backings. --, therefor.

<u>Column 14</u>
Line 65, delete "sec-Butyllithim," and insert -- sec-Butyllithium, --, therefor.

<u>Column 15</u>
Line 11, delete "sec-Butyllithim," and insert -- sec-Butyllithium, --, therefor.
Line 16, delete "230 mL," and insert -- 230 mL --, therefor.

<u>Column 16</u>
Line 28, delete "parts" and insert -- parts. --, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*